United States Patent [19]

Vinatzer

[11] Patent Number: 4,920,378
[45] Date of Patent: Apr. 24, 1990

[54] METHOD AND A MEASURING APPARATUS FOR DETERMINING THE EXPOSURE TIME IN PHOTOGRAPHIC COPYING

[75] Inventor: Alex Vinatzer, Brixen/Milland, Italy

[73] Assignee: Durst Phototechnik GmbH, Bozen, Italy

[21] Appl. No.: 284,077

[22] Filed: Dec. 14, 1988

[30] Foreign Application Priority Data

Dec. 16, 1987 [IT] Italy .................................. 4858 A/87

[51] Int. Cl.$^5$ ............................................ G03B 27/80
[52] U.S. Cl. ......................................... 355/68; 355/77
[58] Field of Search ............................. 355/38, 68, 77; 356/404, 444

[56] References Cited

U.S. PATENT DOCUMENTS 4,236,818  12/1980  Fauchier, II ...................... 355/38 X

FOREIGN PATENT DOCUMENTS 2935705  8/1985  Fed. Rep. of Germany .

Primary Examiner—L. T. Hix
Assistant Examiner—D. Rutledge
Attorney, Agent, or Firm—Cahill, Sutton & Thomas

[57] ABSTRACT

A method for determining the exposure time in photographic copying includes measuring the light intensity at different measuring points of the projected picture of the original to be copied for an initial copying light intensity, and forming a mean value of the light intensity values measured at such points; the exposure time for a current copying light intensity is determined by modifying the aforementioned mean value with a proportional action factor corresponding to the ratio of the light intensity value measured at a selected one of the measuring points for the current copying light intensity relative to the light intensity value measured at the same point for the initial copying light intensity. An apparatus for determining the exposure time in accordance with such method includes a microprocessor which determines the ratio of the aforementioned light intensity value measured at the selected measuring point for the current copying light intensity relative to the value measured at the same point for the initial copying light intensity; the microprocessor determines the exposure time as a result of the aforementioned mean value as modified by the aforementioned ratio.

9 Claims, 1 Drawing Sheet

METHOD AND A MEASURING APPARATUS FOR DETERMINING THE EXPOSURE TIME IN PHOTOGRAPHIC COPYING

BACKGROUND OF THE INVENTION

The invention relates to a method and a measuring apparatus for determining the exposure time in photographic copying by means of enlarging or copying apparatuses.

For determining the required exposure time for a given original to be copied, a light measuring apparatus, also called photometer, is normally used, by means of which the original is measured with respect to its density in order to derive from it the exposure time according to the known relation $$I_E \times t_{exp} = K \quad (1);$$

wherein $I_E$ is the intensity of the copying light, which penetrates the original to be copied; $t_{exp}$ is the exposure time, i.e., the duration of the effect of the light intensity $I_E$ on the copying material; and K is a constant, the value of which must be determined during a calibrating phase with respect to a test original and the used copying material.

Light measuring apparatuses of this type generally comprise a measuring probe, which can be positioned in the copying plane of the enlarging apparatus, for measuring the light intensity at a selected point of the projected picture, and of a signal evaluating circuit for converting the measuring signal to a corresponding value of the exposure time. The thus determined exposure time is indicated on a display device or the corresponding time signal is used directly for controlling the exposure in the enlarging apparatus. Light measuring apparatuses are also known, which have storage devices for the temporary storing of the measuring values with respect to various measuring points, and which have computing devices for carrying out computing operations by means of the stored measuring values, such as the formation of a mean value or the determination of the difference between the extreme values. A light measuring apparatus of this type is described, for example, in German Patent DE-C 2935705, where the exposure time can be derived, instead of from an individual value, from the mean value of several measurements at different points of the projected picture.

Applications exist, in which it is preferred to expose by means of a fast given exposure time and to control the exposure, instead of by means of the time, by means of the intensity of the light, for example, by means of a diaphragm. The exposure with a constant exposure time (approximately equal to that of the calibrating conditions) is used, for example, in order to prevent the occurrence of the known Schwarzschild Effect (deviation from the reciprocity theorem), which results in anomalies in the exposure if the exposure time varies within an excessive range. Similarly, if the light measuring apparatus does not control the exposure directly, but the determined time must first be transmitted to the control device, it may be advantageous for practical reasons and in order to reduce the risk of errors, to work with a constant exposure time and to adjust the diaphragm correspondingly.

The objective in the indicated cases is therefore to convert a value of the exposure time, which was determined by means of a light measuring apparatus, into another given value and to change the light conditions correspondingly. This will not result in any problems if the indicated exposure time is the result of an individual measurement at an individual point of the picture, because then a direct relationship exists between the change of the light intensity and the indicated exposure time. However, the conversion by means of the known light measuring apparatuses will no longer be possible if the indicated exposure time is the result of a formation of a mean value from the measurement of a plurality of selected points of the picture.

SUMMARY OF THE INVENTION

The present invention is based on the object of providing a method and a measuring apparatus by means of which an exposure time, which is based on the result of the formation of a mean value from the measuring values of a plurality of points of the projected picture, in a simple manner, can be adapted to changes in the intensity of the copying light, which take place after the formation of the mean value.

According to the method of the invention, the exposure time, which is based on the mean value of the measurement of the plurality of selected measuring points, is corrected continuously according to a proportional action factor, which, for the given measuring point, expresses the relationship between the momentary value entered into the formation of the average value and the continuous measuring value in the same measuring point. As a result, the exposure time indicated by the light measuring apparatus, in addition to being a function of the measuring values in the individual picture points, when the average value is formed, is also a function of the continuous value at the measuring point, which is being measured at the time, and the resulting time can therefore, by an influencing of the light intensity, be returned to a given value, without as a result changing the mean value on which the determination of the exposure time is based.

Thus for example, a determined exposure time, if it deviates considerably from the calibrated exposure time, so that an unsatisfactory exposure must be feared as a result of the Schwarzschild Effect, may be returned to a desired value by adjusting the diaphragm, while at the same time observing the continuously indicated value, if the measuring probe, during the adjustment of the diaphragm, remains on the measuring point which was selected last.

In order to be able to measure the whole projected picture with a reasonable number of individual measuring points, it may be advantageous to select, in the measuring phase, a reduced enlarging scale, which differs from that of the actual copy. What is involved in this case is the conversion of the exposure time, which was determined with respect to a certain enlarging scale, into the corresponding exposure time with respect to another enlarging scale. If now the measuring probe remains on the measuring point that was last selected for the formation of the mean value, the apparatus according to the invention, when the enlarging scale is changed, furnishes, for each newly adjusted scale, the correct exposure time while maintaining the distribution of light measuring values on which the mean value is based.

Advantageously, the formation of the mean value and the subsequent computation of the mean exposure time is carried out during the measurement of each individual point of the row of measuring points so that the operator can make a decision at any time concerning the number of measuring points.

Other characteristics and advantages of the method and of the apparatus for carrying out this method according to the invention are found in the dependent claims in combination with the description of a preferred embodiment, which will be described in the following by means of the attached drawings.

DETAILED DESCRIPTION OF THE PREFERRED EMBODIMENT

Figure 1:
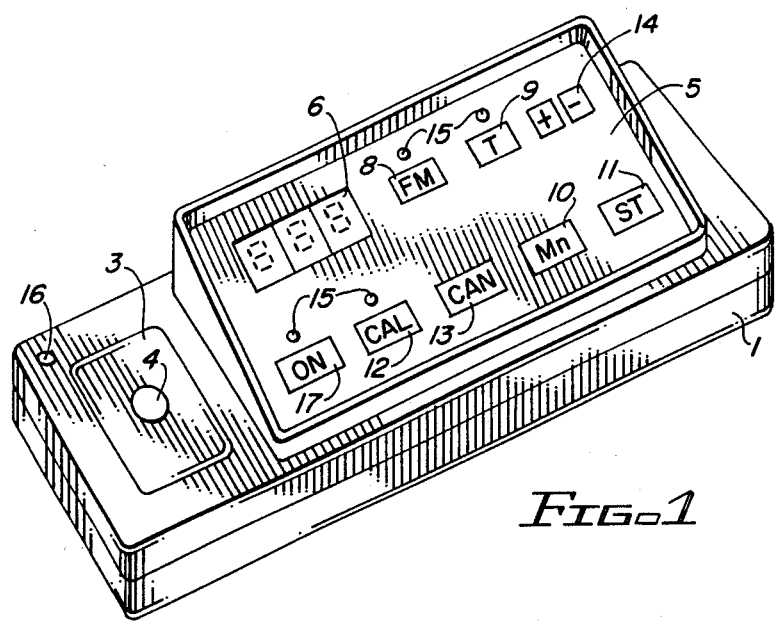
FIG. 1 is an overall view of the measuring apparatus according to the invention.

The measuring apparatus in the preferred embodiment shown in FIG. 1 has a flat housing 1 which contains the main components of the measuring and signal evaluating circuit. A top cover surface 2 of the housing has a light incidence field 3 with a light aperture 4, in the area of which, on the inside of the housing, a photoelectric transducer is arranged (not visible in the figure). Laterally of the light incidence field 3, on the cover surface 2, a display and control panel 5 is located having an illuminated digit display 6, an on-off key 7, operating mode selecting keys 8 and 9, a storage key 10, a start key 11 and other command input keys 12–14, the function of which will be explained in the following description of the measuring apparatus. Indicator lamps 15 assigned to the individual keys indicate their switching condition.

Otherwise, the housing is dimensioned such that it can be positioned freely in the projection plane of an enlarging apparatus in such a manner that the light of a selected point of the projected picture, through the aperture 4, falls onto the photoelectric transducer. The whole forms a compact measuring unit which is suitable for being used as a measuring probe in the projection plane of the enlarging apparatus.

Figure 2:
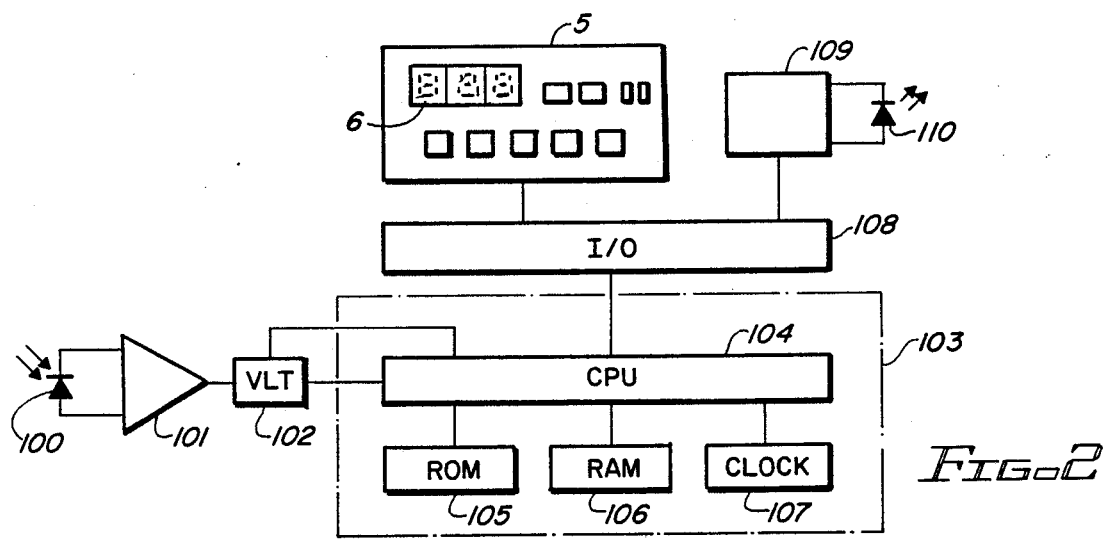
FIG. 2 is a block diagram for explaining the operating principle of the measuring apparatus according to the invention.

According to the block diagram of FIG. 2, the measuring circuit of the apparatus according to the invention has a photoelectric transducer, preferably a photodiode 100, the light-sensitive surface of which is arranged behind the aperture 4 of the light incidence field 3 of the housing 1. The photodiode is connected to the input of a signal amplifier 101, which is configured as a current/voltage converter, so that at its output, a voltage is generated which is proportional to the photoelectric current of the diode and thus to the intensity of the measuring light. The output of the amplifier 101 is connected with a voltage/time converter 102, and the output signal of the latter is finally fed to a microprocessor system 103 for further processing. The microprocessor system comprises a central microprocessor (CPU) 104 with the peripheral elements, such as the program memory (ROM) 105, the data memory RAM) 106, the clock (CLOCK) 107 and an input/output port (I/O) 108. Via the input/output port 108, the control panel 5 (compare FIG. 1) as well as a time circuit 109, the function of which will be described later, are also connected to the microprocessor 104, which also supplies the triggering signal for the voltage/time converter.

The microprocessor system is programmed to compute the exposure time on the basis of the light intensity taken up by the photodiode. When the exposure time is determined on the basis of the measurement of an individual point of the picture, it is computed by the microprocessor system according to the initially mentioned relation (1), which expressed logarithmically becomes $$t_{exp} = 10^{K - \log I_E} \qquad (2),$$

wherein $I_E$ is the value of the taken-up light intensity, expressed as a function of the time $t_f$ indicated by the voltage/time converter 102, and K is a constant to be determined during the calibrating phase.

If, however, the exposure time is to be determined on the basis of a plurality of measurements at different points of the picture to be exposed, the computer is prepared such that it first computes the geometric mean $I_M$ of the light measuring values $I_{10}, I_{20}, \ldots I_{no}$ according to the relation $$\log I_M = \frac{\log I_{10} + \log I_{20} + \ldots \log I_{no}}{n} \qquad (3)$$

and subsequently, the mean exposure time $t_{mexp}$ according to the relation $$t_{mexp} = 10^K + C_n - \log I_M \qquad (4),$$

wherein K is the constant to be determined in the calibrating phase and $C_n$ is a logarithmic quantity which expresses the relationship between the momentary light measuring value $I_{no}$, which is entered into the formation of the mean value, and the continuous measuring value $I_n$ at the same measuring point.

When the meaning of the amount $C_n$ is taken into account, it can be easily recognized from (4) that the resulting exposure time displayed on the display device, via $C_n$, is inversely proportional to the continuous measuring value of the last point of the elected series of measuring points and that therefore a change of the light intensity in this point with respect to value $I_{no}$ at the point in time of the formation of the mean value from the values $I_{10}, I_{20}\ldots, I_{no}$ results in a corresponding change of the indicated exposure time. In other words, a change of the light intensity, which occurs after the formation of the mean value, on the basis of the continuous measurement of one single, and specifically the last point of the series of measuring points, is converted to the corresponding change of the indicated mean exposure time.

The mean exposure time according to (4) is computed and displayed after the measurement of each individual point with respect to this point and the preceding measuring points. In order to facilitate the computation of the mean value according to (3) after a new measuring point is added to the measuring points already taken into account, the sum $S_n = \log I_{10} + I_{20} + \ldots + \log I_{no}$, according to (3), is stored, and a counter, which is internal to the system, of the number n of measuring points is incremented by one unit during the measurement of each additional point. This approach makes it possible to arbitrarily expand the number of measuring points without, beforehand, having to determine the number itself.

For the measuring of an original to be copied for the purpose of determining the exposure time, in practice, the measuring apparatus is first, by means of pressing the corresponding control key 8 (FM), set to the control mode "photometer", and the measuring probe is positioned in the projection plane of the enlarging apparatus in a selected area of the projected picture in such a manner that its measuring light falls onto the photodiode 100. The microprocessor system will then, on the basis of the determined light intensity, compute the exposure time according to the above-indicated relation (2) and displays the thus obtained time on the display device 6. It is assumed that the value of the constant K is known from an initial calibration and is stored in the memory. The stored value of K, by means operating the key 12 (CAL) provided for this purpose, can be displayed on the display device and can be increased or reduced by pressing one or the other key of a pair 14 of keys (+/−). Advantageously, the device is designed in such a manner that several values of K, which are assigned to a respective calibrating condition, with respect to a specific test original and/or the used type of copying material, can be stored in separate storage channels. The individual storage channels, which may be marked, for example, by means of progressive numbering, by means of the key 13 (CAN) provided for this purpose, can be called in connection with the pair 14 (+/−) of keys, in which case, when the key 13 is pressed, the number of the operative channel first appears on the display device 6, and starting from there, the desired channel is selected by operating the pair 14 of keys.

If, in contrast, a mean exposure time is to be determined with respect to several measuring points of the original to be copied, the measuring probe is successively brought into the selected positions, and during each measurement, the memory key 10 ($M_n$) is actuated on the control panel 5.

When the storage key 10 is actuated, the microprocessor system computes the geometric mean $I_M$ of the light measuring values measured up to then and, from that, computes the mean exposure time according to the above-indicated relations (3) and (4). For this purpose—triggered by the actuating of the storage key 10—the momentary measuring value $I_{no}$ of the point being measured at the time, instead of the previously stored measuring value referring to the preceding measuring point, is written into the memory, and the counter reading of the measuring point counter is incremented by one unit. In anticipation of an expansion of the formation of the mean to additional measuring points, the new value of the sum $S_n = \log I_{10} + \log I_{20} + \log I_{no}$ is also stored. With the actuation of the storage key 10 at the selected measuring point, the momentary measuring value at this point is included in the series of measuring values, by means of which the formation of the mean takes place, and the same value, once it is stored, becomes the reference value for light changes which subsequently are noticed at the same point.

It is understood that the ratio $I_{no}/I_n$ between the stored value $I_{no}$ and the continuous measuring value $I_n$ is equal to one, and the corresponding logarithmic amount $C_n$ of relation (4) is equal to zero, as long as no changes of the light intensity occur at the measuring point with respect to the light conditions at the moment of the measuring value storage triggered by the storage key. However, a change of the light intensity, for example, as a result of an adjustment of the diaphragm or of the adjustment of another enlarging condition, via $C_n$ of relation (4), leads to a corresponding change of the resulting exposure time. When the measurement is concluded, the determined exposure time, as it appears on the display device, is transmitted to the exposure control of the enlarging apparatus, so that, during the exposure, the projection light is switched on for the indicated time period.

Preferably, the measuring apparatus according to the invention itself comprises a timer. During the switching-over to the timer operation after the measurement of the exposure time by means of actuating the key 9 (T) of the control keys of the control panel 5 provided for this purpose, the time determined and displayed during the measurement remains stored. Upon a starting signal, which is triggered by means of the start key 11 (ST), the time expires from an initial full value to zero. During this countdown and for the exact duration of this countdown a control signal is present at an output of the measuring apparatus, which determines the switching-on time of the projection light of the enlarging apparatus. In the timer operation, the indicated time can be changed in both directions by means of the pair 14 (+/−) of keys.

In the described embodiment, the time control signal is emitted by an infrared emitter 110, preferably a photodiode which is arranged behind an aperture 16 of the cover surface of the housing 1 (FIG. 1) and is controlled by the microprocessor system.

Figure 3:
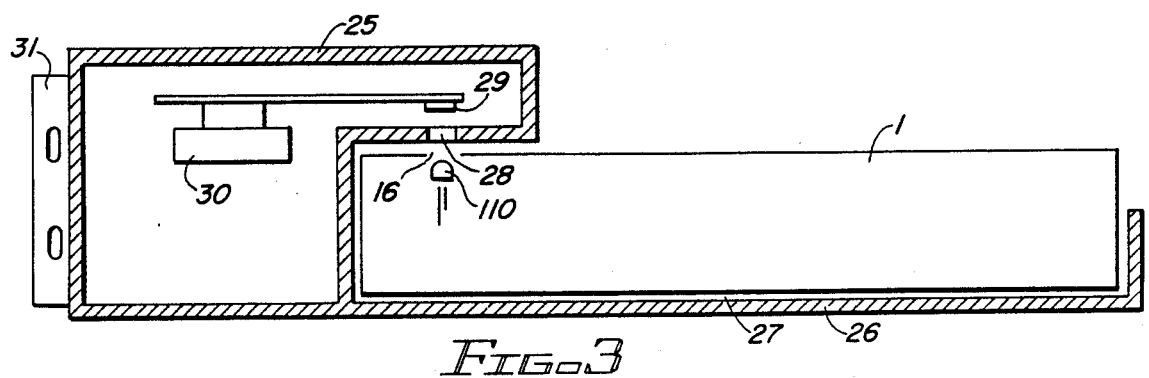
FIG. 3 is a measuring apparatus in combination with a timer.

In FIG. 3, the above-described measuring probe is shown schematically in combination with a switching module 25 functioning as the timer. The housing of the switching module has a lateral extension 26 which forms a receiving means 27 for the measuring probe housing 1. The shape and the dimension of the switching module are such that, when the measuring probe is placed in the receiving means 27, the infrared emitter 110, via the aperture 16 of the probe and a corresponding opening 28 of the switching module, is aligned with an infrared sensor 29 in the interior of the switching module. The sensor 29, via a control circuit known per se, controls a switching element, such as an electromechanical relay 30, which switches the power supply on and off for a socket 31 with which the supply cable of the enlarging apparatus can be connected, so that the enlarging apparatus itself, as a function of the signal emitted by the infrared emitter 110 of the measuring apparatus operating as the timer, is switched on or off.

The measuring probe is advantageously provided with an independent power supply; it may, for example, be driven by a battery. The absence of electrical lines makes it particularly mobile. As a result of the coupling by means of infrared rays, the photometer/timer combination becomes the exposure switching apparatus by means of simply depositing the probe in the receiving means of the switching module.

I claim:

1. A method for determining the exposure time in photographic copying by means of photographic enlarging or copying apparatuses, the photographic enlarging or copying apparatus having a copying light source of variable intensity and being adapted to form a projected picture, in a copying plane, of an original to be copied, comprising in combination the steps of measuring the light intensity of the projected picture in the copying plane at a plurality of different measuring points of the projected picture, for a given copying light source intensity, to provide a corresponding light measuring value for each of the different measuring points, forming a mean value of the light measuring values of said plurality of different measuring points, determining an exposure time for said given copying light source intensity in accordance with said mean value, measuring a continuous light measuring value at a selected one of said measuring points after forming the mean value, and continuously modifying the exposure time resulting from the mean value in accordance with a proportional action factor which expresses the relationship between the light measuring value entered into the formation of the mean value at a selected one of said measuring points and the continuous light measuring value at the selected measuring point.

2. A method according to claim 1, wherein the light measuring value of the selected measuring point which is entered into the formation of the mean value, is stored for the continuous comparison with the continuous light measuring value at the same point.

3. A method according to claim 2, wherein, during each individual measurement at said plurality of different measuring points of the projected picture, the mean value of the light measuring values is formed with respect to the measuring point being measured at the time and the preceding measuring points.

4. A method according to claim 3, further including the step of forming, during each individual measurement, the arithmetic sum of the individual light measuring values which have been entered into the formation of the mean value, and storing the arithmetic sum, to facilitate the expansion of the mean value to additional measuring points without, beforehand, knowing the number of measuring points to be used.

5. A measuring apparatus for determining the exposure time in a photographic enlarging or copying apparatus, the photographic enlarging or copying apparatus being adapted to form a projected picture, in a copying plane, of an original to be copied, said measuring apparatus comprising a measuring probe which can be positioned in the plane of the picture, for generating light measuring values assigned to a plurality of selected measuring points of the projected picture, as well as a microprocessor system for computing the exposure time on the basis of a mean value of the light measuring values from the plurality of selected measuring points, wherein the microprocessor system determines a ratio of the measuring value entered into the formation of the mean value at a selected measuring point and a continuous measuring value measured at the same point, and modifying the exposure time resulting from the formation of the mean value in accordance with this ratio.

6. A measuring apparatus according to claim 5 wherein the microprocessor system stores the measuring value attributed to each measuring point and entered into the formation of the mean value.

7. A measuring apparatus according to claim 5 wherein the microprocessor system stores an arithmetic sum of the individual measuring values which are entered successively into the formation of the mean value.

8. A measuring apparatus according to claims 5, 6, or 7 further including at least one manually operated key for allowing a user to manually enter an exposure time, and wherein the microprocessor system furnishes a time control signal which corresponds to the exposure time determined by the measuring apparatus or a manually entered exposure time.

9. A measuring apparatus according to claim 8, wherein the time control signal is furnished in the form of an infrared radiation.

* * * * *